Patented Feb. 24, 1942

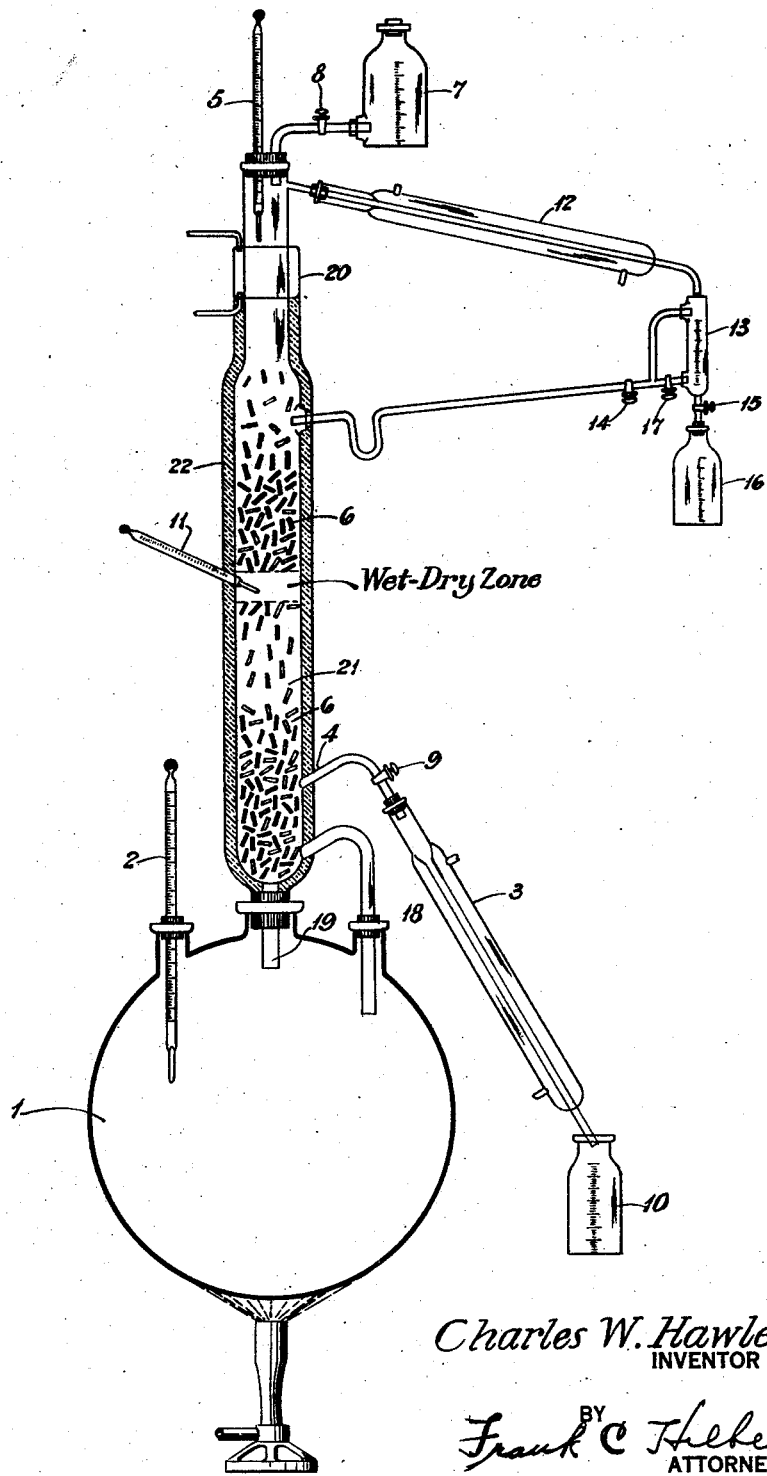

2,274,061

UNITED STATES PATENT OFFICE 2,274,061

ESTERIFICATION PROCESS

Charles W. Hawley, New Brunswick, N. J., assignor to E. I. du Pont de Nemours & Company, Wilmington, Del., a corporation of Delaware Application December 13, 1939, Serial No. 308,927

13 Claims. (Cl. 260—488)

This invention relates to a continuous or semi-continuous process for producing volatile organic esters and more particularly esters from the lower aliphatic alcohols and the lower monocarboxylic fatty acids.

The fundamental reaction involved in esterification is simple and has been thoroughly studied by many investigators. Esters such as ethyl acetate, butyl acetate and amyl acetate are being produced in enormous quantities for use in many fields, the most important of which is the field of nitrocellulose lacquers. The need for large volumes of solvent at low prices has stimulated the development of several methods of producing these esters, and in particular, has led to the development of several proposed schemes for their continuous production. The older conventional batch process, in which substantially equi-molecular proportions of alcohol and acid are placed in a reaction vessel or still pot, have required the use of a catalyst to facilitate esterification. These methods have also depended largely upon the principle of distilling from this reaction mass a ternary mixture of ester, alcohol and water. It has been possible in some cases to separate water from the distilled ternary by the addition of a further quantity of water which causes a separation into two layers, the upper layer being much richer in ester than the lower layer, and this is returned to the still. The water layer contains considerable alcohol from which the alcohol is later recovered. This procedure is particularly efficient in the production of ethyl acetate. The production of butyl acetate does not require the addition of water to the ternary distillate because separation into two layers occurs as soon as the vapors are condensed, and in this case the lower layer or water layer contains only traces of ester and alcohol, so that the upper layer can be returned directly to the reaction vessel or refined in separate equipment.

The development of continuous processes for the production of esters has been made possible largely through the variation of the ratios of the reactants used. For instance, it is known that when the ratio of acid in the reaction vessel is substantially in excess of that of the alcohol, that in addition to the ternary azeotrope of ester, alcohol and water, it is possible by maintaining a correct reflux ratio to also distill over a binary of ester and water, and in this fashion, secure a total distillate substantially higher in ester content than that of the ternary. Horsley, U. S. Patent 1,770,779, discloses the use of a reaction mixture in which the alcohol is present in excess of that of the acid, but in this case the process is successful only when the water of reaction is insufficient to supply a complete ternary, and is thereby dependent upon a distillate comprising some ester, alcohol and water and an additional binary of ester and alcohol, thus obtaining a distillate which is richer in ester than the ternary. Of the two methods a high ratio of acid to alcohol appears to be the more practicable.

It is the object of this invention to produce esters, in one step and through the use of a single distilling column, which are substantially free from water and sufficiently high in ester content to be usable directly in commercial practice. Commercial esters are in general not sold as 100% pure ester but normally obtain small percentages of the corresponding alcohol. For instance, ethyl acetate is normally sold as an 85% ester. Normal butyl acetate is sold as a 90% ester. Another object is the provision of a process for simultaneous esterification and refining of esters in a single column. Another object is the provision of a process for manufacturing volatile organic esters in which the acid is substantially completely esterified and in which the neutralizing step is eliminated, whereby unusually high yields are obtained. A further object is the provision of a process utilizing substantially standard equipment with only minor modifications. A still further object is the provision of a process for manufacturing refined esters which requires only one still pot or reaction vessel and one distilling column. A still further object is the provision of a process which can be made substantially continuous in operation. Other objects will appear hereinafter as my invention is described.

I have found that I can produce lower aliphatic esters of high quality, substantially free from water and having commercial utility, by a one-stage method utilizing a conventional still pot or boiler, a single distilling column of either the plate type or the packed type and a water separator, by means of which substantial proportions of certain components can be returned to the distilling system, as well as allowing removal of water from the reaction system. I have accomplished this by avoiding the usual ester take-off at or near the top of the distilling column, and instead taking off the ester at a point in the lower section of the distilling column where I have found a relatively narrow zone of substantially pure ester to exist when my process is carried out as is hereinafter described.

In the drawing the single figure represents a diagrammatic plan view of apparatus suitable for carrying out the invention. In order that the parts may be readily understood, they are illustrated by means of laboratory apparatus, although it will be understood that when the process is carried out on a commercial scale, plant type apparatus will replace that shown. In the drawing, 1 is a reaction vessel fitted with a thermometer 2 or other means of indicating temperature. Connected with the reaction vessel is a packed column 6 containing packing 21, although this may be replaced by plates or Raschig rings. The column is connected with the reaction vessel by means of pipe 19 and also an arm 18. Above the arm 18 but below the wet-dry zone boundary, is another side arm 4 which is fitted with a valve 9 and leads into a condenser 3 which in turn leads into a collecting vessel 10. The wet-dry zone boundary in the column is approximately midway, and this area is provided with a thermometer 11. Near the top of the column a dephlegmator 20 is provided and also a thermometer 5 and a feeding vessel 7 suitably connected to the column and a valve 8 in the connection to regulate the flow of liquid into it. At the top of the column is also provided another side arm leading into condenser 12 which collects any vapors which may reach the top side arm. This also relieves the pressure in the system. Any distillate reaching this point is condensed in 12 and collected in the calibrated vessel 13 which in turn leads back into trap 23 to the packed column. The flow of the liquid from 13 to the column is regulated by valves 14 and 17. The liquid, however, may be collected in vessel 16 by opening valve 15. The column is provided with insulation indicated as 22.

In order to understand and appreciate the principle upon which my process operates, it must be stated that a fractionating column, when properly operated, soon reaches a state of equilibrium. This is true, even when fresh reactants are continuously introduced and a condensate continuously drawn off, provided the temperature conditions at all points in the column are maintained constant. I have found that each zone in the column will have its characteristic temperature, and as one moves up and down the column, the temperature will be found to vary considerably, the highest temperature being found at the bottom of the column and the lowest at the top. Of even greater importance is the fact that I have found that there exists an unexpectedly narrow zone in the column which I propose to call the borderline between wet and dry vapor. In the manufacture of n-butyl acetate, for instance, I have found that this boundary zone is very sharp and that a temperature differential of at least 10° C. exists on either side of this narrow boundary zone. On investigation it was found that the dry vapor, that is, the zone directly under the boundary zone, was comprised of vapors substantially free from water and contained extraordinarily high concentrations of ester with correspondingly low concentrations of alcohol. Above the boundary zone, examination showed increasing concentrations of both alcohol and water vapor.

These conditions exist, however, only when the vapors from the conventional still pot or boiler are in themselves high in ester content. I propose to take advantage of my discovery in the following fashion: I introduce, in my preferred example, a quantity of either commercial or pure ester into the still pot, avoiding the presence of any of the reactants which I later add continuously to my system through the upper portion of a distilling column. The ester is brought to boil and a heavy reflux maintained through the major portion of the distilling column. When the temperatures in the distilling column have reached predetermined points as hereinafter described, I add continuously to the upper part of the distilling column a mixture of acid and alcohol, and in some cases, a catalyst such as sulfuric acid, in amounts so calculated that I am continuously adding to the system sufficient materials to maintain continuous operation over long periods of time, and to avoid the building up of either acid or alcohol concentrations. As this reaction mixture trickles through the column, ester and water are formed. The heavy reflux of ester acts as a heat transfer means and also as a rectifying means for the complex mixture present in the upper portion of the distilling column, and by maintaining constant temperatures in the distilling column, by means of the ester reflux, so that the temperatures, for example, at the top of the column and at a point just above the boundary of the wet and dry zone, and the temperature at the ester take-off which is placed below the boundary line of the wet and dry zone, are carefully maintained, I take off substantially pure ester at a rate equivalent to that at which the reaction is proceeding.

The conditions existing in the upper portion of the column are as follows: A ternary of ester, alcohol and water is formed and is led off from the top part of the column into a separator where the water is separated by means of stratification and removed from the system. The upper layer which consists of ester and alcohol with only traces of water is returned to the column in order that the alcohol be made available for further reaction. Thus, by continuously removing water from the upper portion of the distilling column which, in this case, acts as the reaction vessel, the equilibrium between $$\frac{acid \times alcohol}{ester \times water} = K$$

becomes unbalanced, more ester and water is formed and the reaction thus goes on towards completion. As the ester concentration in the lower part of the column builds up, there is a tendency for the upper limit of the dry zone to rise. The ester vapors having the desired purity are drawn off from a point in the lower part of the column at a rate sufficient to prevent any such rise. If the ester is drawn off at an excessive rate, the upper limit of the dry zone will drop. The change in position of the boundary zone can readily be determined by thermometers placed in the column at suitable points. Therefore, by regulating the rate of the introduction of new reactants and rate of withdrawal of product as well as the rate of reflux of my ester from the still pot, I can maintain a continuous state of temperature equilibrium within the column and remove both water and ester continuously from my system.

It is necessary to establish temperature conditions and rate of feed for each ester produced and for each unit of equipment used. The process is broadly applicable for the manufacture of such esters as methyl and ethyl acetates and propionates, propyl formate, propyl acetate, propyl propionate, propyl butyrate, butyl formate, butyl acetate, butyl propionate, butyl butyrate, butyl valerate, amyl formate, amyl acetate, amyl propionate, amyl butyrate, amyl valerate, secondary propyl formate, secondary propyl acetate, secondary propyl propionate, secondary butyl formate and secondary butyl acetate. The process is of particular merit in the preparation of esters from alcohols and acids containing from 2 to 5 carbon atoms. It will be seen that my process avoids the necessity of utilizing high ratios of acids to alcohol or conversely of high ratios of alcohol to acid, and I may use reactants in substantially equi-molecular proportions except for a slightly greater concentration of alcohol. This excess of alcohol is lost from my system by being drawn off in the stratified water layer. Therefore, the quantity of alcohol in excess of equi-molecular proportions varies with the particular ester being produced. If, however, it is desired to produce a product of lower ester concentration, this may be accomplished by including in the reaction mixture a greater excess of alcohol.

A semi-continuous process is also possible when catalyst is added to my reactants in order to speed up the rate of reaction in the distilling column. In this instance, inasmuch as the usual catalyst, sulfuric acid, is non-volatile, it slowly trickles down the column and is eventually found to be concentrated in the ester still pot, so that some provision must be made for removing it at intervals to prevent dehydration of the ester present in the still. It will be seen that in my preferred embodiment I have in the ester still pot none of the reactants and, therefore, have provided a system capable of producing substantially pure ester in the lower portion of the column. A modified embodiment of my invention comprises reacting initially in the still pot an equi-molecular ratio of acid and alcohol in the presence of a small amount of catalyst, in order to establish an initial charge of ester at this point. This is accomplished by allowing the reaction to proceed to equilibrium and then refluxing and taking off by means of the water separator substantially all of the water of reaction formed and returning the ester and alcohol to the column. This is continued until the reaction is substantially completed, and in certain cases the removal of water may be aided by the addition of a third liquid immiscible with water such as benzene, toluene or hexane. When the reaction has been completed, a heavy reflux of the ester formed is maintained and fresh reactants added, as previously described, to the upper portion of the column and the process becomes continuous from this point on. A disadvantage of this system is that there exists in the lower still pot a concentration of sulfuric acid at all times, and while when this is maintained at a low concentration, no substantial harm is done, it prevents the flexibility of operation possible with my preferred procedure.

*Example 1*

To further explain and illustrate my invention, I have produced n-butyl acetate having an ester content of 95%, an acidity of 0.076% expressed as acetic acid and having a dryness of 17 to 1. The dryness represents a test in which to 1 part by volume of ester 17 parts of benzine were added before any haziness developed, the haziness indicating the separation of water.

I placed in the lower still pot designated as 1 on the accompanying drawing, 200 volumes of commercial n-butyl acetate having a saponification of 90%. The contents of the still pot were then heated until a substantial reflux was obtained with a still pot temperature ranging from 120 to 125° C. as measured by the thermometer 2. At this point, it was found possible to withdraw dry ester vapor through a condenser 3 mounted at the take-off point 4 on the drawing. The temperature indicated by the thermometer 5 at the top of the packed, insulated distilling column 6 was found to be approximately 90° C. A mixture of fresh reactants in the ratio of 500 parts by weight of butyl alcohol and 345 parts by weight of acetic acid, together with about 2 parts by weight of sulfuric acid, was then introduced at the top of the distilling column from vessel 7, through valve 8 in the form of a slow trickle and the valve 9 on the ester take-off 4 opened so that an amount of ester substantially equivalent to that introduced in the form of acetic acid was condensed through condenser 3 into container 10. A thermometer 11 introduced at a point in the column substantially midway between top and bottom was maintained at a constant value between 120–125° C. by the adjustment of the rate of the introduction of the reactants, and the take-off 4 of the ester, through condenser 3.

Valve 14 from separator 13 remained open throughout the process to allow a steady return of liquid high in ester and alcohol to the column. The water layer was removed through valve 15 either periodically or at a rate comparable to the rate of formation. In this manner, when 370 volumes of mixed food liquid had been introduced, the ester product had been taken off to the extent of 315 volumes, and a water layer of 45 volumes had been split out by the separator into container 16. The reaction was stopped at this point in order to study the concentrations of the components; otherwise, the equipment could have been operated continuously or until the concentration of sulfuric acid in the still pot 1 had built up to a point where substantial dehydration of the ester in it would have taken place. In the drawing 20 represents a dephlegmator, 18 a vapor line, and 19 a liquid return line. The function of these parts of the equipment is conventional, merely facilitating operation of the process, and is well understood in the art.

*Example 2*

Isobutyl acetate having an ester content of 88.1%, an acidity of 0.1% and a dryness of 19 to 1 was produced in similar fashion. In this instance, the temperature at the top of the column ranged from 94 to 107° C. and the temperature of the still pot between 115 and 120° C. A total mixed feed of 242 volumes having a composition of 500 parts by weight of 95% isobutyl alcohol and 345 parts by weight of 99.5% acetic acid was introduced into the column. 240 volumes of the ester described were taken off and a water layer of 32 volumes was removed by the separator. This reaction was run continuously for 10 hours and apparently could have been continued indefinitely.

*Example 3*

In the manufacture of ethyl acetate, due to the fact that water does not separate readily from the ternary azeotropic mixture formed, it becomes necessary to add a water carrier such as hexane or an equivalent liquid to the still charge. In one instance, ethyl acetate having an ester content of 85% was produced when a still pot charge of 250 volumes, hexane 25 volumes and sulfuric acid 1 volume was used. When the still had been balanced with hexane refluxing through the separator, the feed consisting of ethyl alcohol (95% by volume) and acetic acid (99.5% by weight) in the ratio of 500 parts to 435 parts by weight, respectively, and sulfuric acid present as a trace, was allowed to trickle into the upper portion of the distilling column. The stopcock 9 controlling the ester take-off was opened slightly.

As esterification occurred, a water layer accumulated in the separator because of the presence of hexane in the condensed liquid. This water was drawn off and the process proceeded substantially the same as in the case of the manufacture of n-butyl acetate and isobutyl acetate. Any tendency of the column to become unbalanced was reflected by the wet-dry border zone moving up or down the column, and the thermometer 11 in the column near the middle indicated such changes. As the wet-dry line dropped the temperature fell rapidly, and as it rose the temperature rose but much more slowly. To insure a dry product, this border zone was kept slightly above the position of the side thermometer 11.

The temperature at the top of the column during the run, which was continued for 33 hours, varied from 58 to 65° C. The temperature at the middle of the column, that is, substantially at the border zone, was maintained between 73 and 75° C. The temperature of the still pot was maintained between 77.5 and 79.5° C. The product obtained in this run had an average analysis of 96.2% ester, an acidity of 0.035 expressed as acetic acid and a dryness of 19 to 1. The water layer taken from the separator was found to consist of hexane 1%, ethyl acetate 18%, ethyl alcohol 31% and water 50%. It will be seen that the water layer required further treatment to recover both the ethyl acetate and ethyl alcohol; also, that a steady loss of hexane was taking place, so that in order to maintain absolutely continuous operation, some hexane must be added to the system either at intervals or continuously.

These examples show the practical nature of my invention and bring out the principles involved. The more important principles are, first, during the continuous phase of my operation substantially no reaction takes place in the still pot. In the operation of my invention, the still pot acts as a central reservoir which can be effectively heated and heat transferred by means of the hot ester vapors to the distilling column and, further, by maintaining an excess of ester, in itself substantially free from organic acid, alcohol and water, I broaden my dry zone in the distilling column and make it possible to withdraw a higher grade of ester than would be the case if substantial concentrations of these other ingredients were constantly passing by means of the reflux through the lower part of my column.

Second, the reaction actually occurs in the upper portion of the distilling column itself, although I may through the preliminary mixing of my reactants obtain some ester formation prior to the introduction into the distilling column. Due to the heat introduced by the vaporized ester, I am able to take off from the top of the column a mixture of ester, alcohol and water from which the water can be separated by stratification.

Third, because the alcohol has a lower boiling point than the ester, any excess alcohol in the portion of the still directly above the wet-dry zone, takes up heat from the excess ester which has been driven from the still pot and in turn is continually refluxed upward. Thus, my invention differs substantially from the prior art in that I carry out substantially all of my reaction in the upper portion of a distilling column and the reactants are kept away from the take-off because of the excess of pure ester existing in the lower part of my system. By balancing the rate of take-off and the rate of feed, I can make my process substantially continuous, and by proper adjustment of temperatures in the still pot, the middle of the column and the top of the column, I can withdraw at a steady rate a commercially satisfactory ester. A further and important distinction resides in the dual functioning of the process whereby esterification and refining are accomplished simultaneously.

The best economical operation of my invention is secured when a careful adiabatic study is made of the conditions existing in the still column, the condenser introduced before the separator and the rate of reflux maintained. It is quite important to avoid heat losses from the sides of the distilling column, and it is also important to avoid lowering the temperature of the vapors taken off from the upper portion of the column more than is necessary to split out water by stratification. In other words, major heat losses will occur because of this condensation necessary in order to remove water from the system. This heat loss can be cut down enormously by avoiding reduction of the temperature of the distilled liquids which are to be returned to the system to a point such that an excess of reflux of the pure ester becomes necessary to continually bring back these condensed liquids to the vapor phase. It is also possible to introduce heat into the distilling column by means of a steam jacket or other heat source, avoiding thereby such excessive refluxing of the pure ester.

The position of the pure ester take-off varies with the type of column used and can only be determined by a study of the composition during actual practical tests. However, once the compositions of the vapors in the zones have been correlated with the temperatures determined in these same zones in the still, it is only necessary to make sure that the operation of the still is carried out at these predetermined temperatures.

If it is desired to manufacture an ester of less purity, this can readily be controlled and accomplished by merely reacting the acid in an excess of the alcohol. Also, the process is well adapted for the refining of crude esters which may have been prepared in other equipment by feeding the crude ester into the column instead of the reacting ingredients as heretofore described.

While I have described in some detail the preferred embodiment of my invention, it will be understood that this is only for the purpose of making the invention clear and that the invention is not to be regarded as limited to the details of operation described, nor is it dependent upon the accuracy of the theories which have been advanced for the results obtained.

While the composition of ternary azeotropes of the lower esters has been obtained by careful scientific tests, it appears to be true that in the process of esterification under practical operating conditions, the composition of the distilled vapors varies substantially from theoretical as the conditions within the column are changed, and more particularly as the ratios between the ingredients in the still and column are varied. In my invention the composition of the vapors from the top of the distilling column is of relatively little importance provided, however, that they allow the separation of water from the system and represent a condition of relatively stable equilibrium throughout.

The new process affords several important advantages. Esterification of volatile organic acids and alcohols which has heretofore required a plurality of operating units to produce an ester of high purity may be accomplished simultaneously with refining of the ester in a single column in the operation of the improved process. Thus, marked economies in equipment and operating cycles are obviously attained. Furthermore, an ester of high purity is possible by proper operation of the process although the degree of purity may also be controlled by simple changes in certain available variables. The process is characterized by unusually high yields, thus attaining an additional desirable objective. In the improved process, the neutralization step required in earlier methods is eliminated, thereby adding further economies in the practice of the present invention. The process may be operated on a continuous basis if desired, thus avoiding expensive shut-down periods for cleaning equipment and lost time required for starting up a new operating cycle.

As may apparently widely different embodiments of this invention may be made without departing from the spirit and scope thereof, it is to be understood that I do not limit myself to the specific embodiments thereof except as defined in the appended claims.

I claim:

1. A process of reacting and refining lower aliphatic esters which comprises passing a heavy reflux of pure ester vapor upwardly into a column and passing a vaporizing reaction mixture of alcohol and acid downwardly whereby a zone of substantially pure ester is formed in the lower part of the said column and thereafter removing the newly formed ester from the lower part of the column.

2. A process for manufacturing volatile organic esters which comprises feeding into the upper part of a column, containing hot vapors of the ester to be formed, a mixture of a lower aliphatic alcohol and a lower fatty acid while maintaining a heavy reflux of the ester, whereby the ester is formed and simultaneously refined and removing the ester from a point near the bottom of the column.

3. A process for the manufacture of volatile aliphatic esters which comprises feeding into the top part of a single distilling column a reaction mixture of a lower fatty acid, a lower aliphatic alcohol, ester and water into a strong upward reflux of substantially pure vaporized ester, splitting out water from a condensate taken from the top of the distilling column, returning to the column the ester and alcohol split out, and removing from the lower portion of the column sufficient ester to maintain balanced conditions in the distilling column.

4. A process for manufacturing volatile aliphatic esters which comprises feeding into the upper part of a column containing hot vapors of the ester to be formed a mixture of a lower aliphatic acid and a lower aliphatic alcohol in substantially equi-molecular proportions while maintaining a heavy upward reflux of the ester, whereby the ester is formed and simultaneously refined, separating water from a condensate taken from the top of the distilling column, returning to the column the ester and alcohol split out, and removing from the lower portion of the column sufficient ester to maintain balanced conditions in the column.

5. A process of claim 3 in which the alcohol and acid consist of an aliphatic alcohol and an aliphatic acid containing from 2 to 5 carbon atoms.

6. A process of carrying out an esterification of a lower aliphatic alcohol and a lower fatty acid characterized by causing the reaction to take place in a distilling column in the presence of an excess of pure ester vapor, whereby at least two zones of vapor are formed in the reaction vessel, one containing substantial proportions of the water of reaction and the other substantially free from the water of reaction, introducing fresh reactants in the upper part of the column, and removing the pure ester from the lower part of the column.

7. A continuous process for the preparation of volatile organic esters of the lower aliphatic alcohols and acids which comprises simultaneously reacting and refining substantially equi-molecular amounts of acid and alcohol in the upper portion of a distilling column containing hot vapors of the ester, exhausting the ester formed at the rate of formation from the lower part of the column, exhausting water by means of azeotropic boiling mixtures from the top of the column and continuously supplying to the wet zone fresh reactants to maintain stable conditions within the column.

8. A continuous process for the preparation of volatile esters of aliphatic alcohols having from 2 to 5 carbon atoms and lower aliphatic acids which comprises filling a distilling column with an excess of vaporized ester, adding to the upper portion of the column fresh alcohol and acid in substantially equi-molecular proportions and withdrawing sufficient ester from the lower part of the column to maintain balanced conditions.

9. The process of claim 7 in which the ester is one of an alcohol selected from the group consisting of ethyl alcohol, butyl alcohol, and isobutyl alcohol.

10. The continuous process of claim 7 where the aliphatic acid is selected from the group comprising acetic, propionic and butyric acids.

11. A continuous process for manufacturing volatile aliphatic esters which comprises reacting a lower aliphatic acid with an excess of a lower aliphatic alcohol in a column containing hot vapors of the ester to be formed, while maintaining a heavy upward reflux of the ester, whereby the ester is formed and simultaneously refined, separating water taken from a condensate taken from the top of the distilling column, returning to the column the ester and alcohol split out adding fresh reactants to the upper part of the column, and removing from the lower portion of the column sufficient ester to maintain balanced conditions in the column.

12. The process for treating crude volatile organic esters containing alcohol, acid, and water which comprises feeding the crude ester into hot vapors of the same ester in the upper part of a distilling column while maintaining a heavy upward reflux and withdrawing the refined ester from a point near the bottom of the column below the wet-dry zone which forms therein.

13. A process for the manufacture of the lower aliphatic esters of the lower fatty acids which comprises continuously feeding the reaction mixture into the upper part of a single distilling column, maintaining a strong upward reflux of the vapors of the same ester at a rate sufficient to form at equilibrium a zone of concentrated, dry, vaporized ester within the single distilling column, continuously separating water from the system, and simultaneously removing sufficient ester from the dry zone to maintain the equilibrium.

CHARLES W. HAWLEY.